(12) United States Patent
Vossoughi et al.

(10) Patent No.: US 9,239,470 B2
(45) Date of Patent: Jan. 19, 2016

(54) ADJUSTABLE EYEWEAR

(75) Inventors: Aria Vossoughi, New York, NY (US);
Ava Vossoughi, Portland, OR (US);
Sohrab Vossoughi, Portland, OR (US)

(73) Assignee: Ziba Labs LLC, Portland, OR (US)

( * ) Notice: Subject to any disclaimer, the term of this patent is extended or adjusted under 35 U.S.C. 154(b) by 148 days.

(21) Appl. No.: 14/115,295

(22) PCT Filed: May 7, 2012

(86) PCT No.: PCT/US2012/036834
§ 371 (c)(1),
(2), (4) Date: Mar. 4, 2014

(87) PCT Pub. No.: WO2012/151591
PCT Pub. Date: Nov. 8, 2012

(65) Prior Publication Data

US 2014/0168599 A1    Jun. 19, 2014

Related U.S. Application Data

(60) Provisional application No. 61/613,407, filed on Mar. 20, 2012, provisional application No. 61/482,998, filed on May 5, 2011.

(51) Int. Cl.
*G02C 5/14*    (2006.01)
*G02C 5/20*    (2006.01)
(Continued)

(52) U.S. Cl.
CPC .. *G02C 5/20* (2013.01); *G02C 5/12* (2013.01); *G02C 5/146* (2013.01); *G02C 5/2236* (2013.01); *G02C 5/2263* (2013.01); *G02C 2200/26* (2013.01)

(58) Field of Classification Search
CPC ...... G02C 5/22; G02C 5/2209; G02C 5/2218; G02C 5/2227; G02C 5/2236; G02C 5/2245; G02C 5/2263; G02C 5/229
USPC ..................... 351/119, 120, 121, 153; 16/228
See application file for complete search history.

(56) References Cited

U.S. PATENT DOCUMENTS 3,841,741 A    10/1974    Vischer, Jr.
4,367,929 A    1/1983    Fortini
(Continued)

FOREIGN PATENT DOCUMENTS

CN    1243966 A    2/2000
DE    3820321 A1    12/1989
(Continued)

*Primary Examiner* — Huy K Mai
(74) *Attorney, Agent, or Firm* — Stoel Rives LLP

(57) ABSTRACT

Eyewear includes a frame front (14) having first and second sides (26, 28) to which are attached respective first and second temple arms (40, 42). The frame front is pivotally coupled to the temple arms to provide multiple tilt adjustment positions that enable a person wearing the eyewear to rotate the frame front about a pivot axis (48) between forward-facing and near-field adjustment positions (52, 56). First and second nose pad arms (**70*l*, 70*r*) couple respective first and second nose pads (**72*l*, 72*r*) to the frame front and have respective first and second nose bridge-contacting surfaces (**74*l*, 74*r*). The nose pad arms extend from the frame front in a direction that sets an offset distance (92) between the nose bridge-contacting surfaces and the frame front to establish a vertical drop distance (98) that allows the user rotating the frame front about the pivot axis to the near-field adjustment position to see over the top long side (86) of the frame front.

7 Claims, 9 Drawing Sheets

(51) Int. Cl.
*G02C 5/22* (2006.01)
*G02C 5/12* (2006.01)

(56) References Cited

U.S. PATENT DOCUMENTS

| | | | |
|---|---|---|---|
| 4,547,048 A * | 10/1985 | Negishi | 351/137 |
| 4,991,952 A * | 2/1991 | Grau | 351/120 |
| 5,751,393 A | 5/1998 | Yamazaki | |
| 7,896,491 B1 | 3/2011 | Lin | |
| 2006/0256282 A1* | 11/2006 | Nakanishi | 351/62 |
| 2007/0252944 A1 | 11/2007 | Welchel et al. | |
| 2008/0074609 A1 | 3/2008 | Ifergan | |

FOREIGN PATENT DOCUMENTS

| | | |
|---|---|---|
| DE | 102006055337 A1 | 6/2008 |
| JP | 58-093029 A | 6/1983 |
| JP | 59-083128 A | 5/1984 |
| KR | 10-1987-0000225 B1 | 2/1987 |
| KR | 10-2000-0011478 A | 2/2000 |
| KR | 10-2001-0114178 A | 12/2001 |

* cited by examiner

The tilting by a fixed angle of a point directly above the pivot location produces a minimal vertical drop at the tilted position.

The tilting by the same fixed angle of a point offset forward of the pivot location produces a larger vertical drop at the tilted position. The greater the offset, the greater the vertical drop.

ADJUSTABLE EYEWEAR

COPYRIGHT NOTICE

© 2012 Aria Enterprises, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

The present disclosure relates to eyewear and, more particularly, to eyewear having an adjustable principal lens plane.

BACKGROUND INFORMATION

Non-corrective eyewear includes safety glasses, sunglasses, or other non-corrective accessory glasses such as 3-D glasses. Corrective eyewear includes eyeglasses having corrective lenses worn to compensate for any of the following vision deficiencies: astigmatism, myopia, hyperopia, and presbyopia.

Astigmatism is caused by non-uniform curvature in the refractive surfaces of the eye resulting in distortion of both near and distant objects. Astigmatism is correctable with cylindrical lenses.

Myopia, or nearsightedness, occurs when the distance between the front and back of the eye is too long such that light is focused prior to reaching the retina, resulting in blurring of distant objects. Myopia is correctable with concave corrective lenses.

Hyperopia, or farsightedness, occurs when the distance between the front and back of the eye is too short such that light is focused beyond the retina, resulting in near-vision (or near-field) blurriness. Hyperopia may be compensated with convex lenses typically found in reading glasses or bifocal lenses.

Presbyopia is caused from aging and results in increased difficulty in near-vision focusing. Presbyopia, like hyperopia, may be corrected with convex lenses; however, unlike the first three forms of vision deficiencies, presbyopia, is presently not correctable by surgery because it is not directly related to the distance between the front refractive eye surface and the retina. Consequently, many older individuals eventually require reading glasses.

Reading glasses are generally available in two styles: full-frames and half-frames (half-glasses or half-eyes). Full-frames have full-sized corrective lenses, while half-frame styles have smaller half-lenses adapted for placement lower on the user's nose. Full-sized lenses provide a wider viewing angle (or field of view) for viewing close-up objects; however, the full-sized lenses also obstruct and blur distant objects. A person wearing full-frame reading glasses cannot readily observe distant objects without first removing the glasses. Conversely, the smaller half-lenses in a half-frame reduces interference with user's normal field of view, i.e., forward-facing or horizontal field of view, but these half-frame styles still obstruct peripheral vision while offering none of the wider viewing angle advantages. The half-frames are therefore less suitable for people requiring a wider near-field view for viewing close-up objects. Furthermore, the half-frames, or "Ben Franklin" styles, are potentially less aesthetically pleasing or less comfortable as they are typically worn lower on the nose.

SUMMARY OF THE DISCLOSURE

Eyewear includes a frame front having first and second sides to which are attached respective first and second temple arms. The frame front is pivotally coupled to the first and second temple arms to provide multiple tilt adjustment positions that enable a person wearing the eyewear to rotate the frame front between a forward-facing adjustment position and a near-field adjustment position. The frame front has a top long side and first and second short sides to which are attached respective first and second temple arms. First and second pivot joints define a pivot axis, the first pivot joint operatively connects the first short side of the frame front and the first temple arm for pivotal movement relative to each other. The second pivot joint operatively connects the second short side of the frame front and the second lens arm for pivotal movement relative to each other. First and second nose pad arms couple respective first and second nose pads to the frame front. The first and second nose pads have respective first and second nose bridge-contacting surfaces, and the first and second nose pad arms extend from the frame front in a direction that sets an offset distance between the first and second nose bridge-contacting surfaces and the frame front. The offset distance establishes a vertical drop distance that allows the user rotating the frame front about the pivot axis to the near-field adjustment position to see over the top long side of the frame front.

This adjustability feature enables the user wearing the eyewear to readily switch from the forward-facing adjustment position to the near-field adjustment position for viewing distant objects with the forward-facing view, while maintaining a wide-viewing angle in the near-field view. The temple arms remain constant in a horizontal position on the user's head as the user rotates the frame front to a selected adjustment position.

In one preferred embodiment, an adjustable eyewear principal lens plane and frame front are adjustable in multiple discrete angular positions. The multiple discrete angular positions provide two or more discrete near-field view tilt positions for the principal lens plane and frame front.

In some preferred embodiments, multiple detents are included to establish a plurality of discrete near-field tilt positions. In one preferred embodiment, a shallower detent may be notched in an elbow bearing surface of a frame front end piece, such that the shallower detent is disposed between first and second deeper detents to establish an angular position with an intermediate degree of tilt relative to a datum lines generally defined along the lengths of the temple arms. In other preferred embodiments, similar adjustment mechanisms can be designed to tilt or pivot the principal lens plane to facilitate the discrete angular positioning.

Additional aspects and advantages will be apparent from the following detailed description of preferred embodiments, which proceeds with reference to the accompanying drawings.

DETAILED DESCRIPTION OF EMBODIMENTS

The term "forward-facing" or "forward-facing view" describes views characterized by a negligible angle between an eyewear user's horizontal line of sight and an observed object. The term "near-field" or "near-field view" describes views characterized by an angle of depression between the eyewear user's forward-facing view and the observed object. "Vertical" and "horizontal" are arbitrary and are intended to facilitate a frame of reference, i.e., forward-facing view is in a horizontal direction. Additionally, for purposes of clarity, symmetrical features of eyewear (e.g., confronting nosepads or temple arms) are sometimes referred to singularly, not plurally. Thus, for example, a concealed nose pad (as well as various other concealed components) is implied by symmetry and is not explicitly described.

Figure 1A:
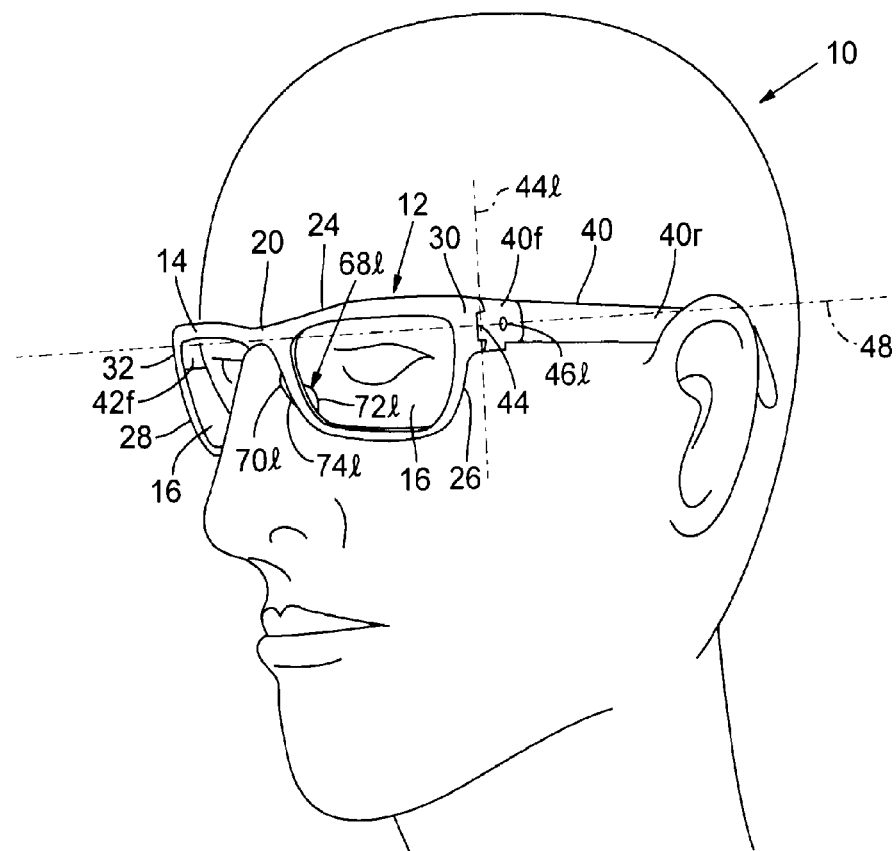
FIG. 1A is a perspective view of the head of a user wearing a preferred embodiment of adjustable eyewear set by the user to a forward-facing adjustment position for normal viewing.
Figure 1B:
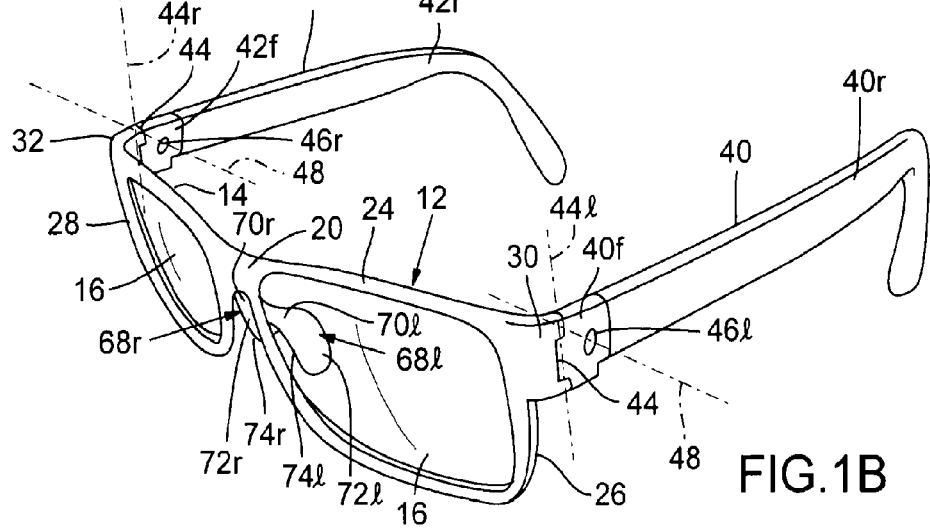
FIG. 1B is a perspective view of the eyewear shown in FIG. 1.

FIG. 1A is a diagram showing the head of a user 10 wearing adjustable eyewear 12, and FIG. 1B is a perspective view of eyewear 12. Eyewear 12 includes a frame front 14 that holds lenses 16 in place and a bridge 20 that spans the user's nose. Frame front 14 has a long top side 24, a first or left short side 26, and a second or right short side 28. A left end piece 30 extends laterally from left short side 26, and a right end piece 32 extends laterally from right short side 28. A first or left temple arm 40 and a second or right temple arm 42 attached to respective left and right end pieces 30 and 32 of frame front 14 either extend over or extend over and behind the user's ears and thereby contribute to holding frame front 14 in place. Hinge joints 44 pivotally connect temple arms 40 and 42 to the respective end pieces 30 and 32. The user pivots temple arms 40 and 42 about hinge joints 44 that define parallel fold axes 44$l$ and 44$r$ to fold temple arms 40 and 42 against the user-facing side of frame front 14 for storage or to open temple arms 40 and 42 at right angles to frame front 14 for wearing.

Left temple arm 40 is composed of a forward portion 40$f$ and a rear portion 40$r$ that are joined by a pivot junction 46$l$. The distal end of forward portion 40$f$ is connected to left end piece 30. Similarly, right temple arm 42 is composed of a forward portion 42$f$ and a rear portion 42$r$ that are joined by a pivot junction 46$r$. The distal end of forward portion 42$f$ is connected to right end piece 32. A straight line connecting pivot junctions 46$l$ and 46$r$ define a pivot axis 48 about which forward portion 40$f$ and rear portion 40$r$ are pivotally movable and about which forward portion 42$f$ and rear portion 42$r$ are pivotally movable. Thus, front frame 14 is pivotally coupled to temple arms 40 and 42 to provide multiple tilt adjustment positions.

Figure 2:
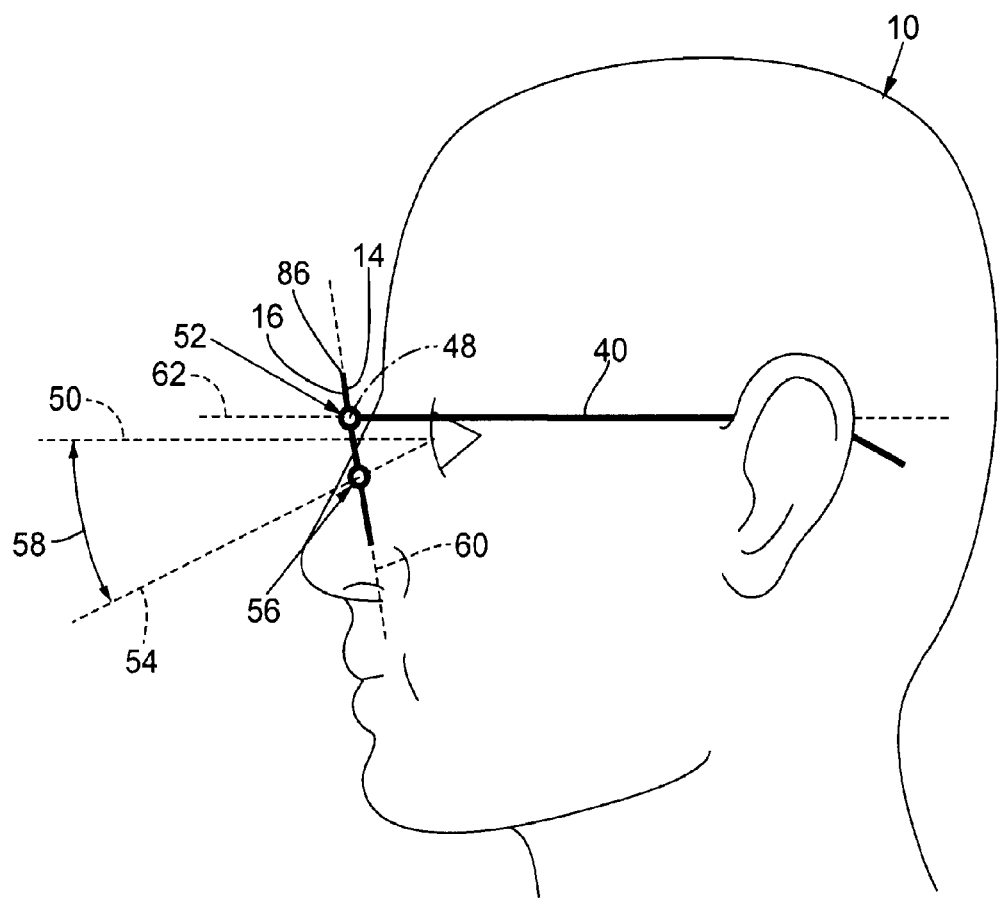
FIGS. 2 and 3 are simplified diagrams showing side elevation views of the head of the user wearing the adjustable eyewear of FIGS. 1A and 1B set by the user to, respectively, the forward-facing adjustment position and a near-field adjustment position for bypass viewing.
Figure 3:
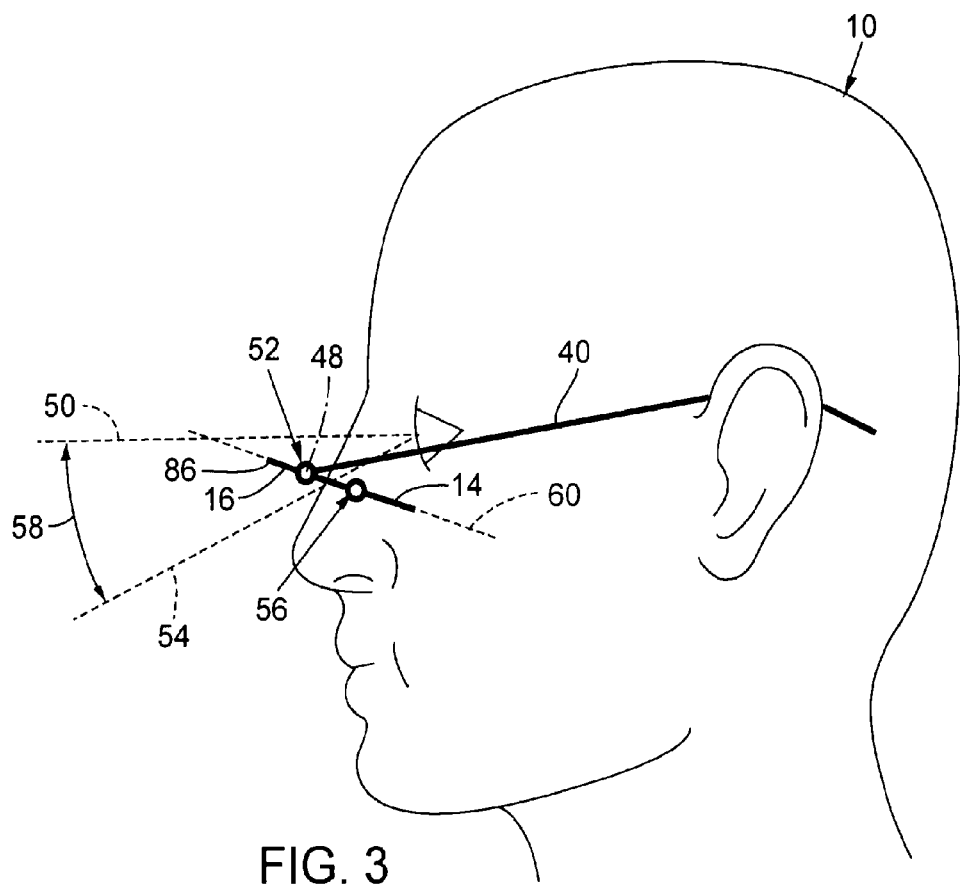

In a preferred embodiment, eyewear 12 is configured to enable user 10 wearing eyewear 12 to rotate front frame 14 and lenses 16 held by it between a forward-facing adjustment position for normal viewing and a near-field adjustment position for bypass viewing. FIGS. 2 and 3 are diagrams illustrating, respectively, a forward-facing view 50 established by a forward-facing adjustment position 52 (position 52) and a near-field view 54 established by a near-field adjustment position 56 (position 56). FIG. 3 also illustrates a problem of forward-facing view occlusion by lenses 16, which problem is addressed below with reference to FIGS. 4A, 4B, 5A, 5B, 6, and 7. FIG. 2 shows position 52 providing a relatively wide viewing angle 58 that encompasses forward-facing view 50 and near-field view 54. FIG. 3 shows user 10 wearing adjustable eyewear 12 set in near-field adjustment position 56 that also provides relatively wide viewing angle 58 but does not entirely remove lenses 16 from forward-facing view 50.

Eyewear 12 is constructed to enable user 10 to readily switch from position 52 to position 56 for viewing distant objects by moving lenses 16 away from forward-facing view 50, while still maintaining a portion of lenses 16 within relatively wide viewing angle 58 for viewing (e.g., reading books) with near-field view 54. Accordingly, user 10 rotates front frame 14 about a horizontal pivot axis 48 and thereby shifts a principal lens plane 60 downwardly relative to datum lines 62 generally defined along the lengths of temple arms 40 and 42.

FIGS. 1A and 1B show eyewear 12 configured with protruding nose pieces 68$l$ and 68$r$ that correct for the occlusion of forward-facing view 50 illustrated in FIG. 3 and provide user 10 with near-field view 54 unimpeded by frame front 14 in near-field adjustment position 56. A left nose pad arm 70$l$ and a right nose pad arm 70$r$ are positioned at the respective left and right sides of bridge 20 and extend from the user-facing side of frame front 14. Left nose pad arm 70$l$ terminates in a left nose pad 72$l$ having a nose-bridge contacting surface 74$l$, and right nose pad arm 70$r$ terminates in a right nose-bridge contacting surface 74$r$. Nose bridge-contacting surfaces 74$l$ and 74$r$ rest against the respective left and right sides of the nose of user 10. FIGS. 1A and 1B show that, for each of nose pieces 68$l$ and 68$r$, the nose pad arm and nose pad are of integral construction. Other types of nose piece construction are possible, such as that shown in FIGS. 8, 9, and 10, in which the nose pad arm and nose pad are discrete component parts joined together. The positioning of protruding nose pieces 68$l$ and 68$r$ extending from frame front 14 allows user 10 rotating frame front 14 about pivot axis 48 to near-field adjustment position 56 to see over top long side 24. FIGS. 4A, 4B, 5A, and 5D are diagrams that are useful in explaining the configuration of eyewear 12 that achieves this result. For purposes of convenience, only a right eyeglass lens 80 is shown in the illustrations.

Figures 4A, 4B:
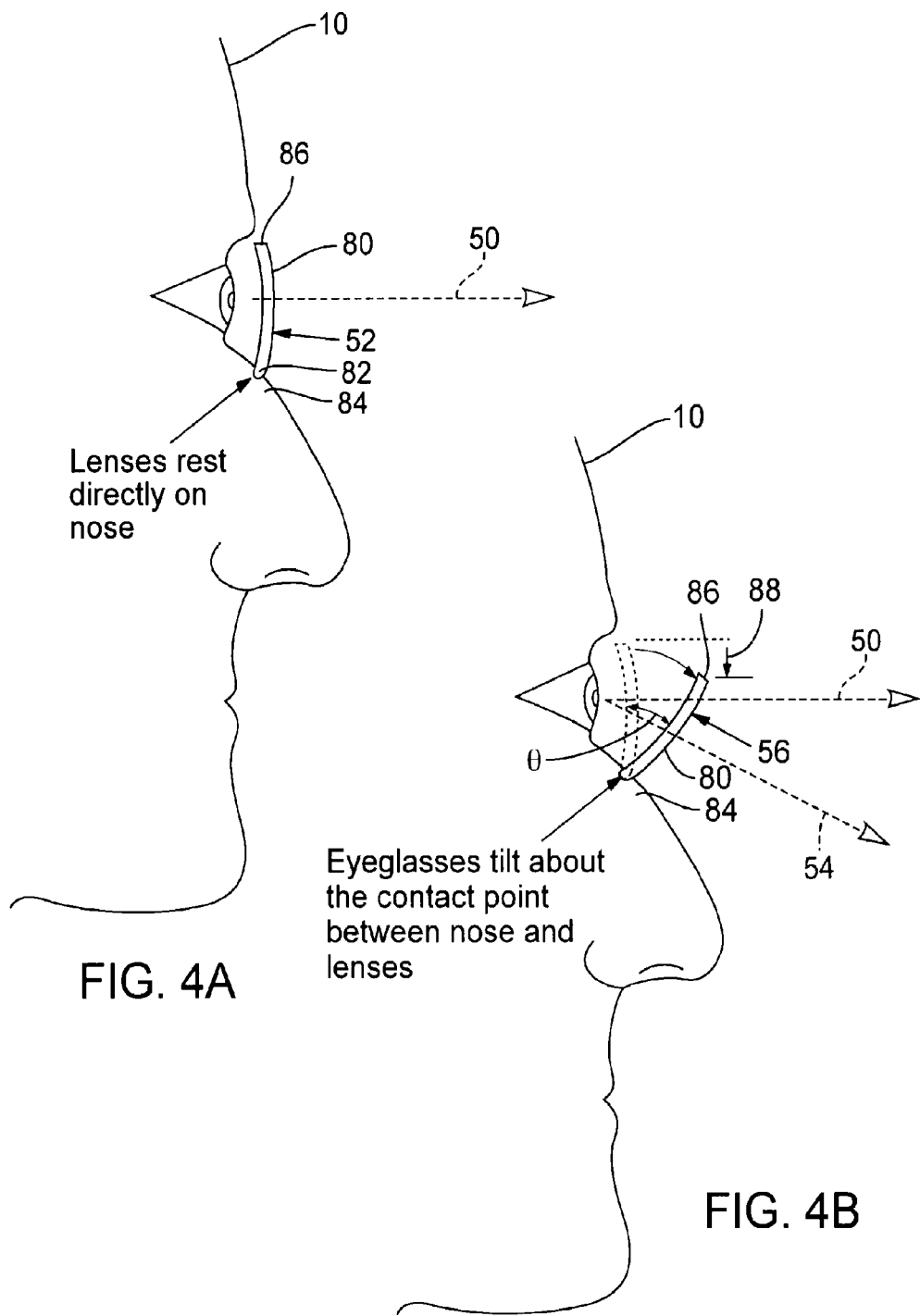
FIGS. 4A and 4B are simplified diagrams showing side elevation views of a user wearing an adjustable lens without a protruding nose pad and with, respectively, no tilt angle for normal viewing and a tilt angle for bypass viewing.

FIG. 4A is a diagram showing user 10 viewing normally through lens 80 resting directly at a contact point 82 on a nose bridge 84 of user 10. In this configuration, a top side 86 of lens 80 is positioned directly above, i.e., in vertical alignment with, contact point 82. FIG. 4B is a diagram showing user 10 bypass viewing with lens 80 tilted in absence of a protruding nose piece. In this configuration, as it rests on contact point 82, lens 80 tilts by angle θ about contact point 82 on nose bridge 84 of user 10. As lens 80 is tilted from normal viewing in forward-facing adjustment position 52 to allow bypass viewing in near-field adjustment position 56, a vertical drop distance 88 of top side 86 remains insufficient to clear a line of direct sight, i.e., forward-facing view 50. Consequently, user 10 of an adjustable right eyeglass lens 80 either has a smaller viewing angle for forward-facing view 50 (with no appreciable benefit for near-field view 54) or needs to reposition contact point 82 lower on nose bridge 84 to see over top side 86 of lens 80.

Figures 5A, 5B:
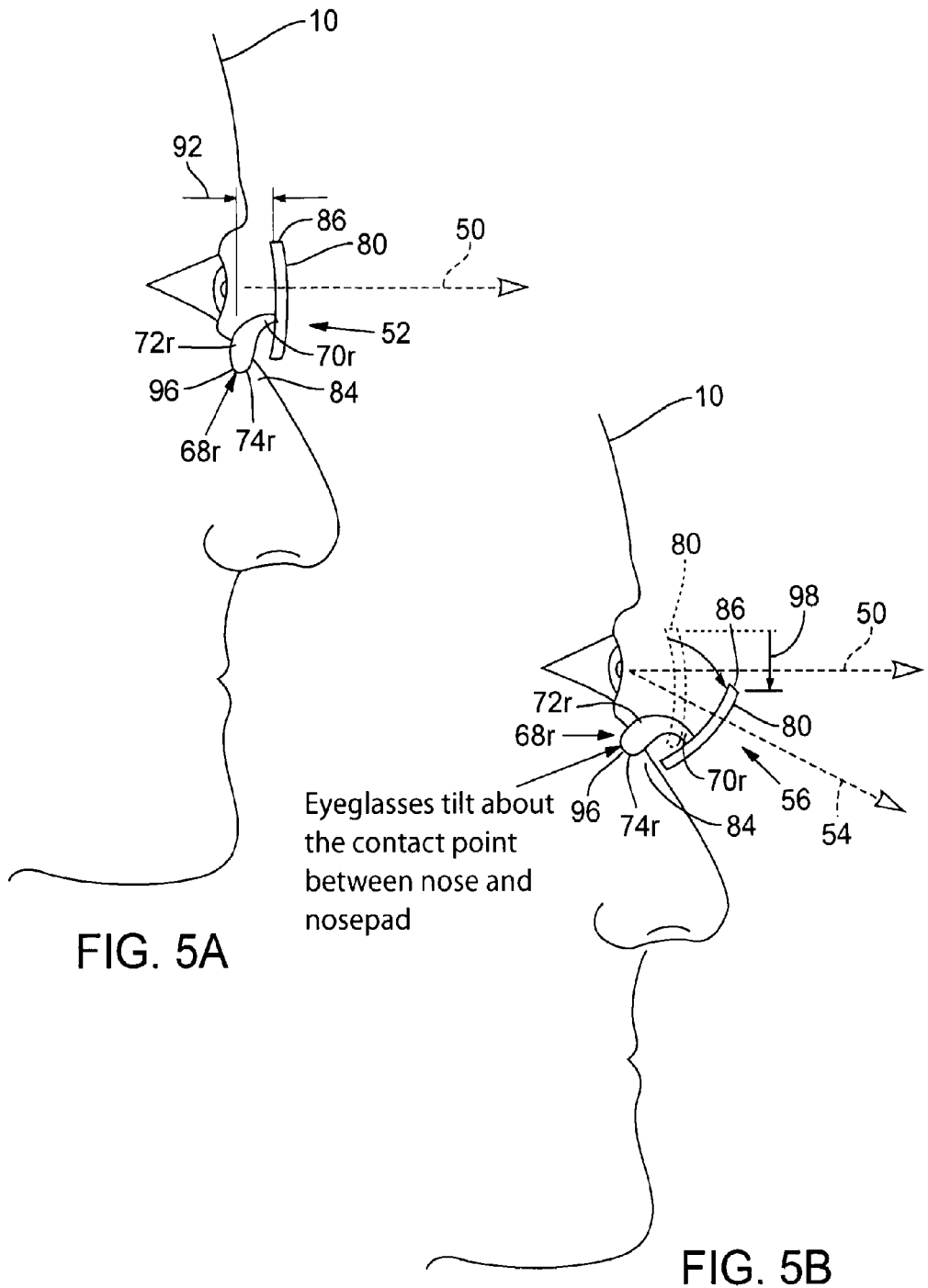
FIGS. 5A and 5B are simplified diagrams showing side elevation views of a user wearing an adjustable lens with a protruding nose pad and with, respectively, no tilt angle for normal viewing and a tilt angle for bypass viewing.

FIG. 5A is a diagram showing user 10 viewing normally through lens 80 held by eyewear (not shown) constructed with protruding nose piece 68r. Nose pad arm 70r of nose piece 68r extending toward user 10 establishes a lens-to-nose offset distance 92 measured from a contact point 96 on nose bridge 84 to top side 86 of lens 80. A typical offset distance 92 is 8 mm-10 mm but depends on the style of eyewear 12 and facial geometry of user 10. FIG. 5B is a diagram showing user 10 performing bypass viewing of tilted lens 80 held by eyewear constructed with protruding nose piece 68r. In this configuration, as it rests on contact point 96, lens 80 tilts by an angle θ about contact point 96 on nose bridge 84 of user 10. As user 10 tilts lens 80 by angle θ while resting on contact point 96, lens-to-nose offset distance 92 produces an increase in vertical drop distance 98 relative to vertical drop distance 88 shown in FIG. 4B. Increased vertical drop distance 98 allows user 10 to maintain contact point 96 in a substantially stationary position before and after a shift in principal lens plane 60 from position 52 to position 56, while also allowing user 10 to see over top side 86 of lens 80 for bypass viewing when eyewear 12 is in position 56. This increased vertical drop distance 98 is readily apparent from the annotated diagrams of FIGS. 6 and 7 showing trigonometric models.

Figure 6:
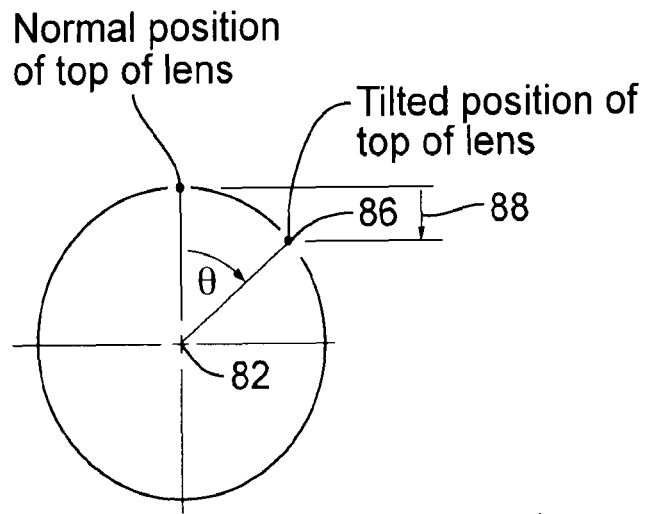
FIGS. 6 and 7 are trigonometric models showing a comparative relationship between vertical drops of a top side of the adjustable lens in FIGS. 4A, 4B, 5A, and 5B without and with a protruding nose pad, respectively.
Figure 7:
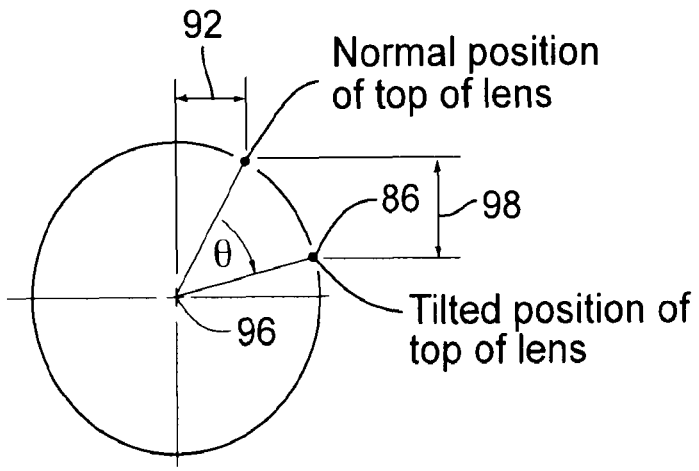

FIG. 6 shows a trigonometric model 100 that corresponds to lens 80 shown in FIGS. 4A and 4B, i.e., lens 80 held by eyewear without a protruding nose pad and negligible lens-to-nose offset because of substantial vertical alignment of top side 86 and contact point 82. Consequently, when lens 80 is rotated by angle θ, vertical drop distance 88 is minimal. In contrast, FIG. 7 shows a trigonometric model 102 that corresponds to lens 80 shown in FIGS. 5A and 5B, i.e., lens 80 held by eyewear including protruding nose pad 72r that establishes lens-to-nose offset distance 92 facilitating a greater vertical drop distance 98 when tilted by the same angle θ.

Figure 8:
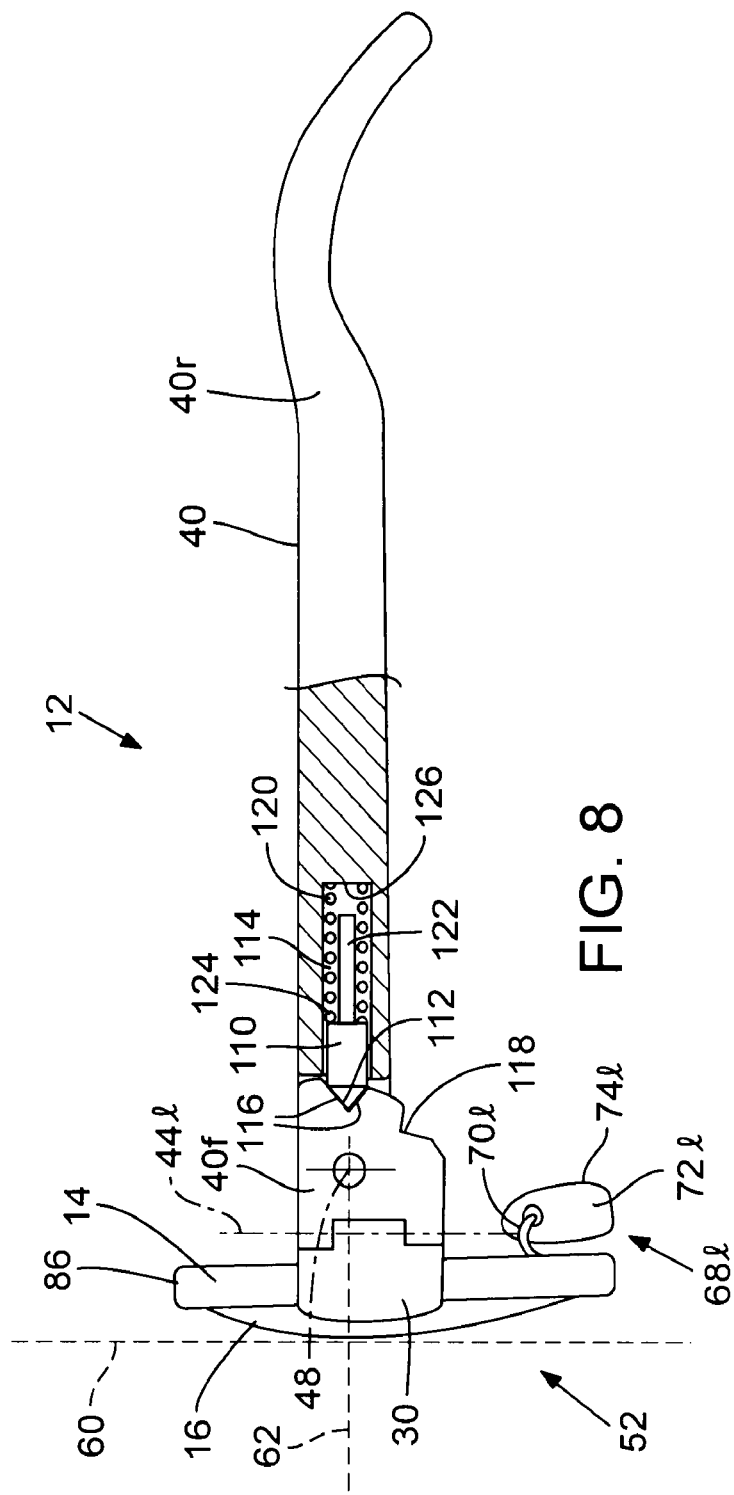
FIGS. 8, 9, and 10 are side-elevation views with portions cut away of adjustable eyewear positioned in respective discrete forward-facing, intermediate, and near-field adjustment positions, the cut away portions showing the mechanism for achieving user-operated rotation from the forward-facing adjustment position to the near-field adjustment position.
Figure 9:
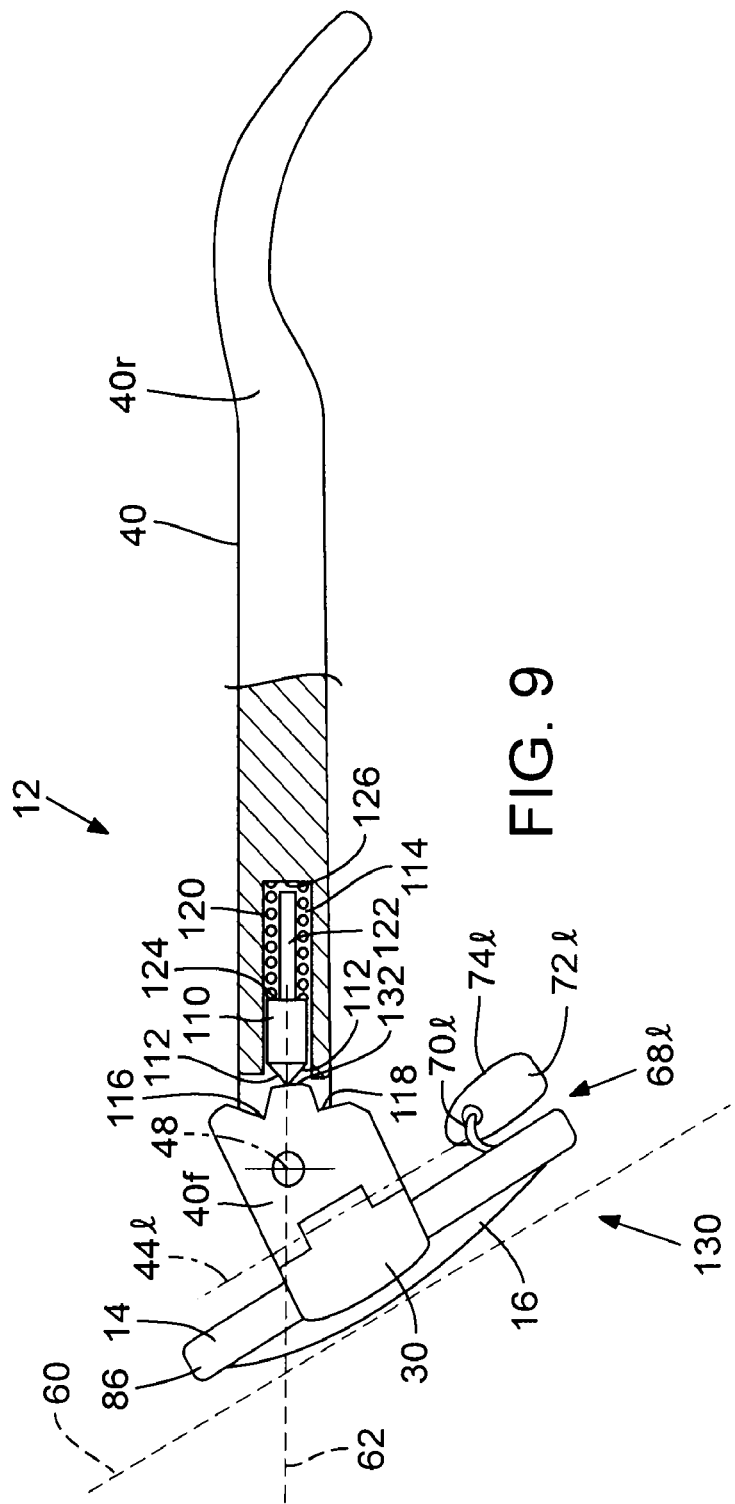
Figure 10:
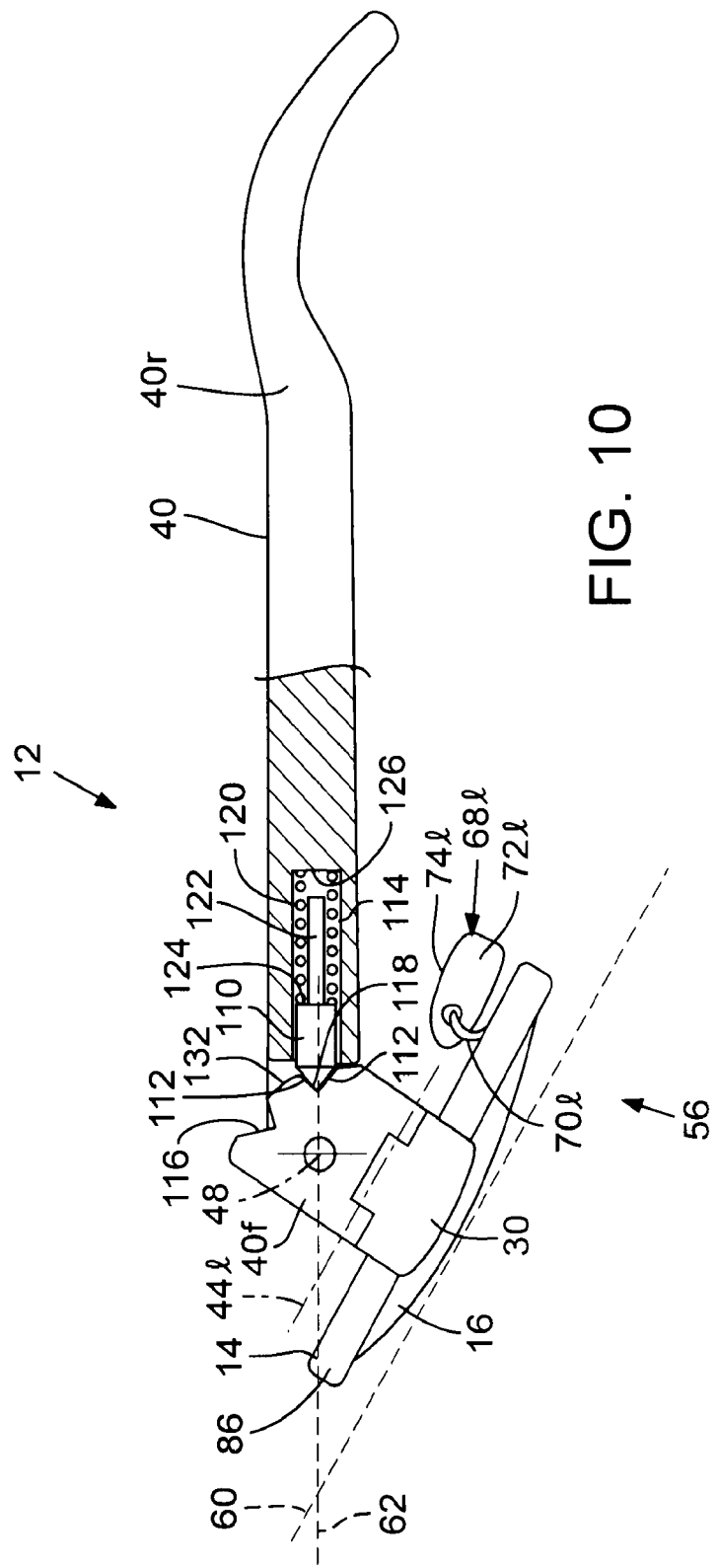

FIGS. 8, 9, and 10 are side-elevation views of left temple arm 40 of adjustable eyewear 12 (a right side is implied by symmetry), showing principal lens plane 60 and frame front 14 transitioned between two discrete angular positions 52 and 56. These two discrete angular positions are maintained by a spring-biased plunger 110 having a contoured plunger face 112 that projects longitudinally outwardly from a spring cavity 114 formed within temple arm 40 at its proximal end. Pivotal movement of frame front 14 about pivot axis 48 causes plunger face 112 to slidably engage first and second detent points 116 and 118 notched within temple arm portion 40f at positions that latch corresponding adjustment positions 52 and 56. As frame front 14 is adjusted from position 52 to position 56 (or vice versa), a coil spring 120 retained inside spring cavity 114, circumscribing a tail 122 of plunger 110, expands and compresses between an inside shoulder 124 of plunger 110 and a back sidewall 126 of cavity 114 to force plunger face 112 to slide along the opposing periphery of temple arm portion 40f and clickably engage detents 116 and 118. Thus, plunger face 112 effectively tracks the profile of temple arm portion 40f as eyewear 12 is adjusted (i.e., tilted) about pivot axis 48.

For example, starting in position 52 (FIG. 8), plunger face 112 is engaged within first detent point 116 such that principal lens plane 60 has essentially zero tilt relative to datum line 62. Spring 120 is fully expanded while eyewear 12 is in position 52. Next, as user 10 rotates frame front 14 downwardly (i.e., counterclockwise) about pivot axis 48 into an intermediate position 130 (FIG. 7), plunger face 112 slides out of detent 116 and along an elbow bearing surface 132 of temple arm portion 40f that is disposed between first and second detent points 116 and 118. Accordingly, spring 120 is compressed while tail 122 approaches back sidewall 126. As user 10 continues rotation of front frame 14 about pivot axis 48, spring 120 forces plunger face 112 outward from cavity 114 to slide into and engage detent point 118, thereby establishing position 56 (FIG. 10) with approximately 45 degrees of tilt relative to datum line 62.

Detent points 116 and 118 associated with pivot junctions 46l and 46r constitute stop members that prevent 360-degree rotation of frame front 14 about pivot axis 48. Detent points 116 and 118 can be set to limit the extent of pivotal movement of frame front 14 about pivot axis 48 to a preferred maximum of about 60 degrees of adjustment. This arrangement allows user 10 to lock frame front 14 into exact tilt positions on each of temple arms 40 and 42 and thereby keeps temple arms 40 and 42 in a constant horizontal position on the head of user 10 wearing eyewear 12 in either forward-facing adjustment position 52 or near-field adjustment position 56.

In other embodiments, multiple detents may be included to establish a plurality of discrete, angular near-field tilt positions. For example, an additional, shallower detent (not shown) may be notched in elbow bearing surface 132 to establish an angular position with approximately 22.5 degrees of tilt relative to datum line 62. Furthermore, pivot junctions 46l and 46r may alternatively be bendable joints, ratcheting joints, or another adjustment mechanisms.

Pivot axis 48 is proximal to fold axes 44l and 44r, although other locations of pivot junctions 46l and 46r along temple arms 40 and 42 are possible. FIGS. 1A and 1B depict hinge joints 44 between end pieces 30 and 32 and pivot axis 48. In another embodiment, pivot axis 48 is located between end pieces 30 and 32 and hinge joints 44. Additionally, fold axes 44l and 44r and pivot axis 48 are generally orthogonal, although some tolerance is within the scope of this disclosure because of the various seating arrangements of hinge joints 44 and pivot axis 48. Fold axes 44l and 44r and pivot axis 48 generally form a plane (not shown) parallel to principal lens plane 60 when eyewear 12 is in position 52.

It will be obvious to skilled persons that many changes may be made to the details of the above-described embodiments without departing from the underlying principles thereof. The scope of the present invention should, therefore, be determined only by the following claims.

The invention claimed is:

1. Eyewear including a frame front having first and second sides to which are attached respective first and second temple arms, the frame front pivotally coupled to the first and second temple arms to provide multiple tilt adjustment positions that enable a person wearing the eyewear to rotate the frame front between a forward-facing adjustment position and a near-field adjustment position, comprising:

a frame front having a top long side and first and second short sides to which are attached respective first and second temple arms;

first and second pivot joints defining a pivot axis, the first pivot joint operatively connected to the first short side of the frame front and the first temple arm for pivotal movement relative to each other, and the second pivot joint operatively connected to the second short side of the frame front and the second temple arm for pivotal movement relative to each other; and first and second nose pad arms coupling respective first and second nose pads to the frame front, the first and second nose pads having respective first and second nose bridge-contacting surfaces that rest on respective first and second contact points on the nose bridge of the person wearing the eyewear, and the first and second nose pad arms extending from the frame front in a direction that sets an offset distance between the first and second nose bridge-contacting surfaces and the frame front to establish a vertical drop distance that allows the person wearing the eyewear to rotate the frame front about the pivot axis to the near-field adjustment position to see over the top long side of the frame front and to maintain the first and second contact points in substantially stationary positions on the nose bridge of the person wearing the eyewear during the rotation of the frame front about the pivot axis to the near-field adjustment position.

2. The eyewear of claim 1, in which the first temple arm includes a first forward portion and a first rear portion that are joined by the first pivot joint, and in which the second temple arm includes a second forward portion and a second rear portion that are joined by the second pivot joint; and further comprising a first hinge joint positioned and defining a first fold axis between the first short side of the frame front and the first forward portion of the first temple arm, and a second hinge joint positioned and defining a second fold axis between the second short side of the frame front and the second forward portion of the second temple arm.

3. The eyewear of claim 2, in which the first and second fold axes are parallel to each other and are orthogonally related to the pivot axis.

4. The eyewear of claim 1, in which the first nose pad arm and the first nose pad are of integral construction, and in which the second nose pad arm and the second nose pad are of integral construction.

5. The eyewear of claim 1, in which the first nose pad arm and the first nose pad are discrete component parts joined together, and in which the second nose pad arm and second nose pad are discrete component parts joined together.

6. The eyewear of claim 1, in which the first temple arm includes a first forward portion and a first rear portion that are joined by the first pivot joint, and in which the second temple arm includes a second forward portion and a second rear portion that are joined by the second pivot joint, the first and second forward portions operatively connected to the respective first and second short sides of the frame front so that the first and second forward portions rotate with the frame front as the person wearing the eyewear rotates the frame front about the pivot axis.

7. The eyewear of claim 1, further comprising first and second stop members associated with the respective first and second pivot joints that limit the extent of pivotal movement of the frame front relative to the first and second temple arms about the pivot axis.

* * * * *